C. C. STUTZ & R. F. ARNOTT.
APPARATUS FOR THE MANUFACTURE OF PAPER CARTONS.
APPLICATION FILED FEB. 16, 1912.

1,202,121.

Patented Oct. 24, 1916.
7 SHEETS—SHEET 1.

C. C. STUTZ & R. F. ARNOTT.
APPARATUS FOR THE MANUFACTURE OF PAPER CARTONS.
APPLICATION FILED FEB. 16, 1912.

1,202,121.

Patented Oct. 24, 1916.
7 SHEETS—SHEET 3.

C. C. STUTZ & R. F. ARNOTT.
APPARATUS FOR THE MANUFACTURE OF PAPER CARTONS.
APPLICATION FILED FEB. 16, 1912.
1,202,121.
Patented Oct. 24, 1916.
7 SHEETS—SHEET 4.
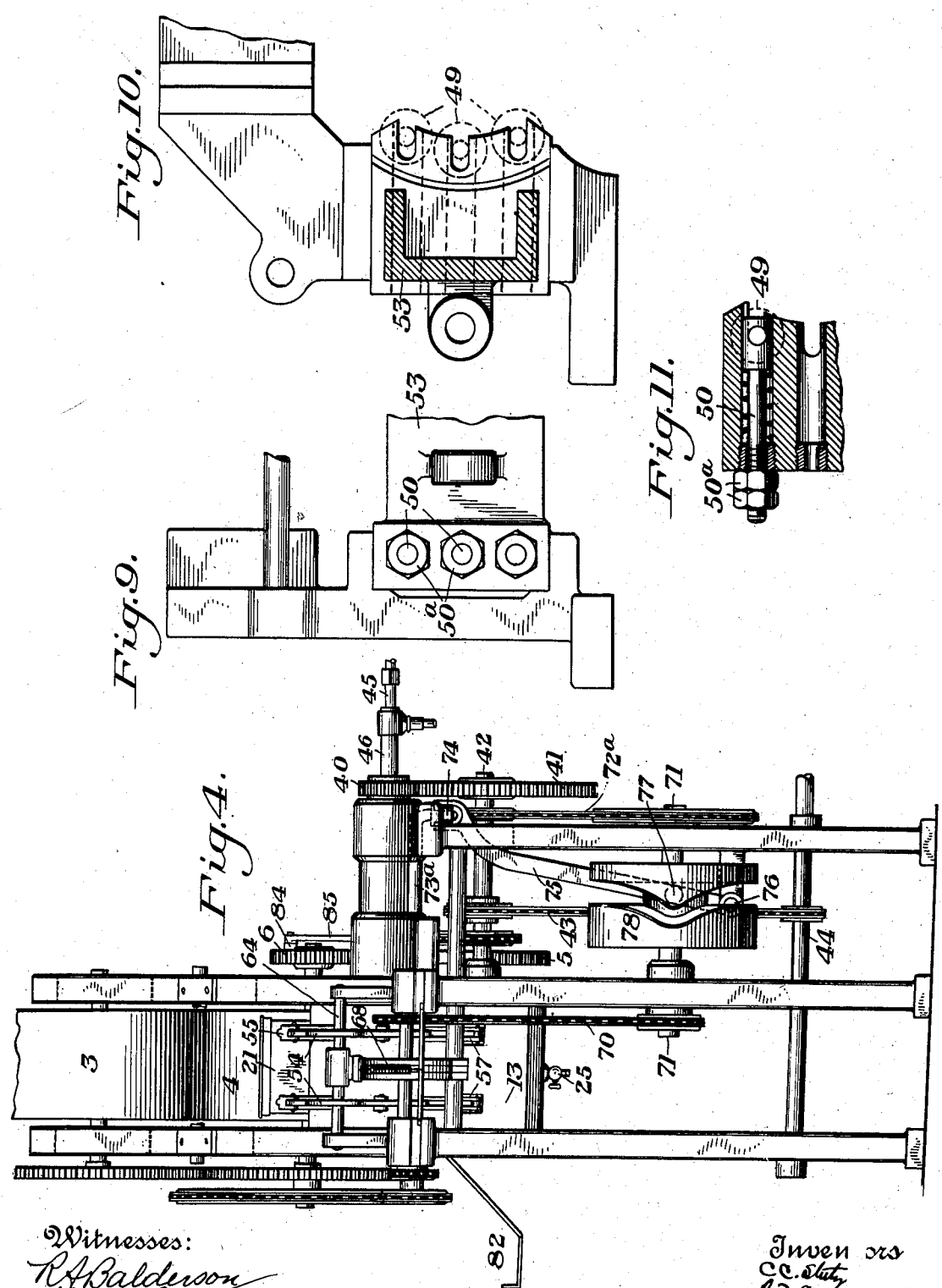

C. C. STUTZ & R. F. ARNOTT.
APPARATUS FOR THE MANUFACTURE OF PAPER CARTONS.
APPLICATION FILED FEB. 16, 1912.
1,202,121.
Patented Oct. 24, 1916.
7 SHEETS—SHEET 5.
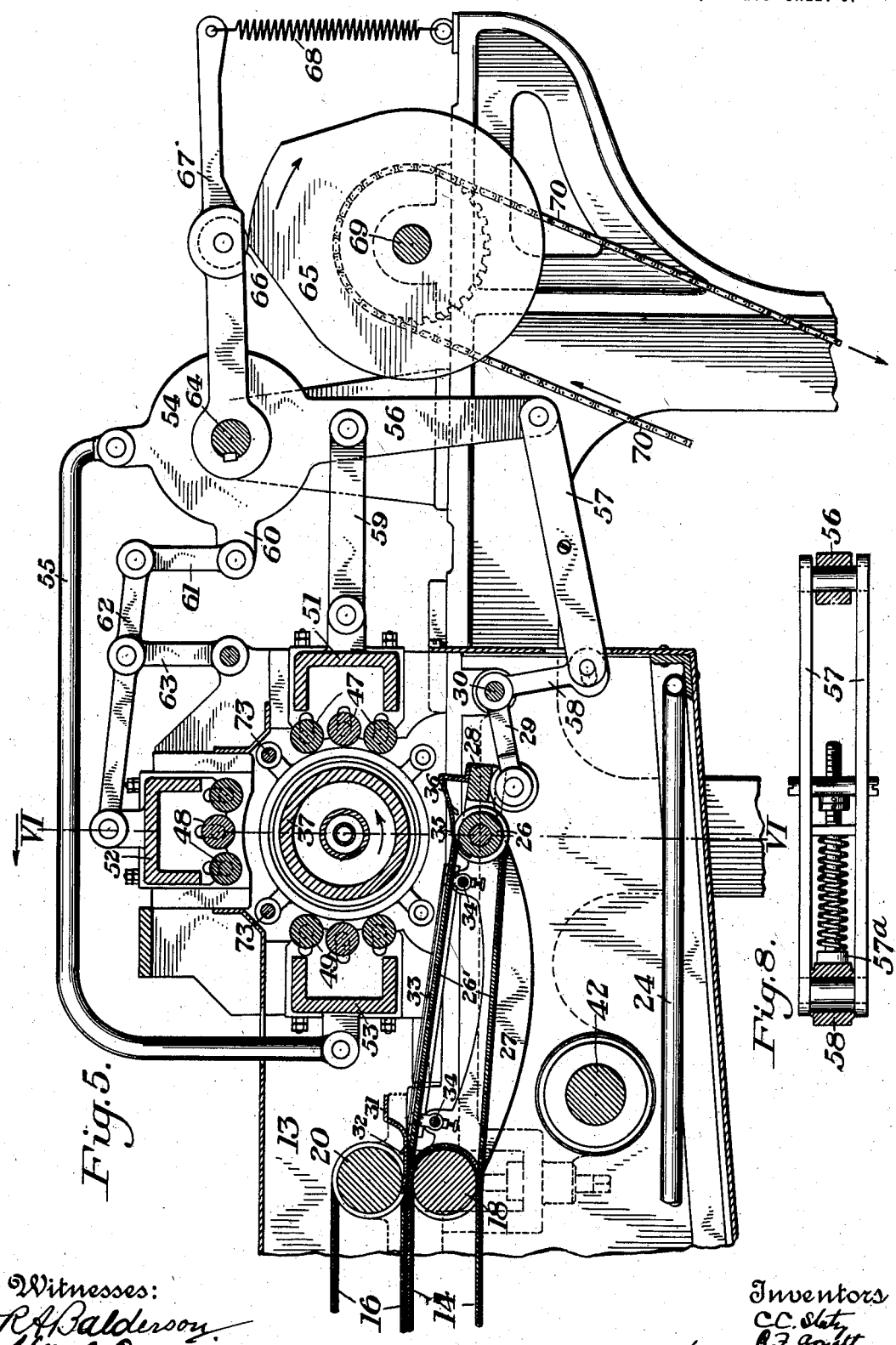

C. C. STUTZ & R. F. ARNOTT.
APPARATUS FOR THE MANUFACTURE OF PAPER CARTONS.
APPLICATION FILED FEB. 16, 1912.
1,202,121.
Patented Oct. 24, 1916.
7 SHEETS—SHEET 6.
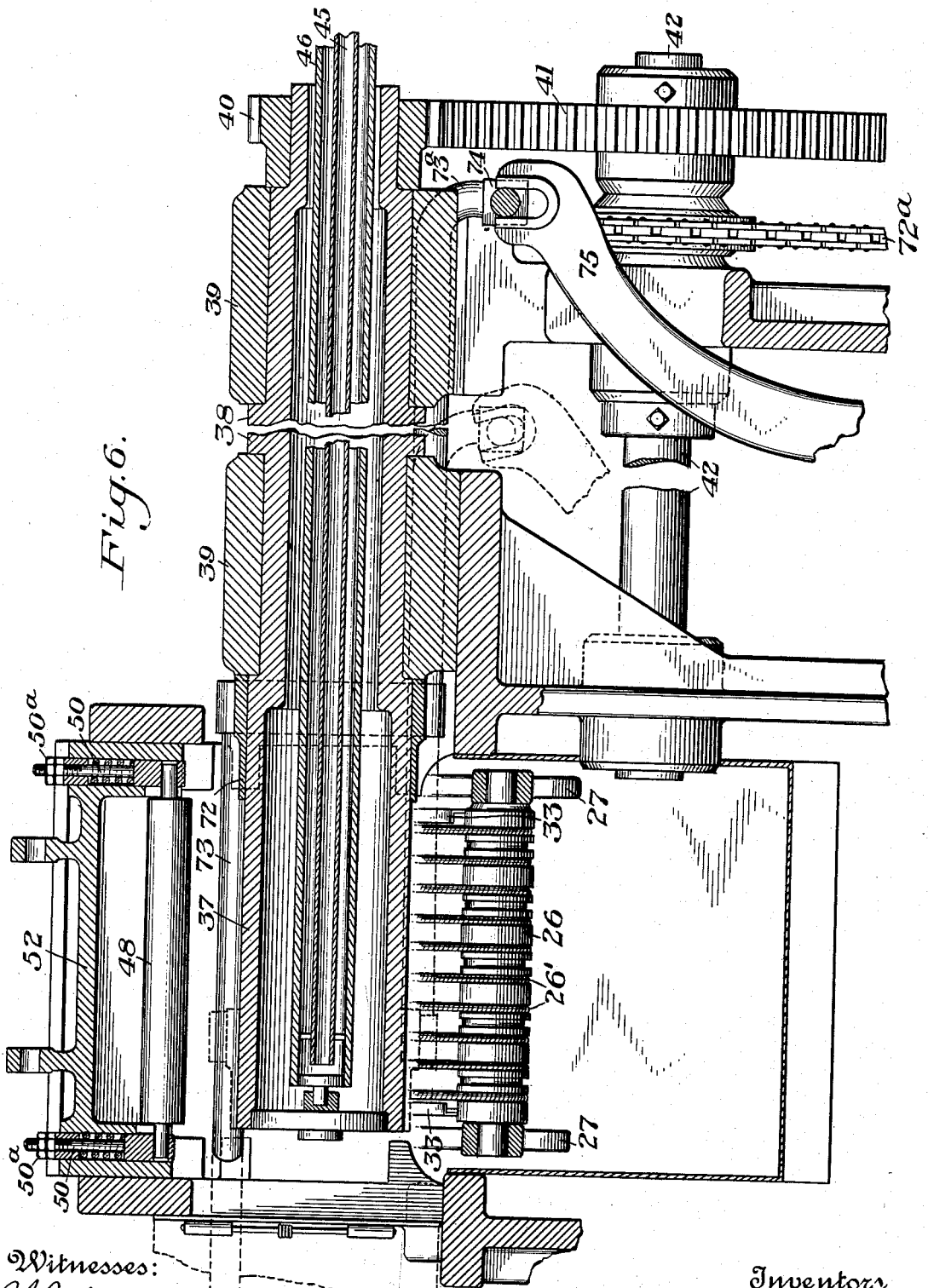

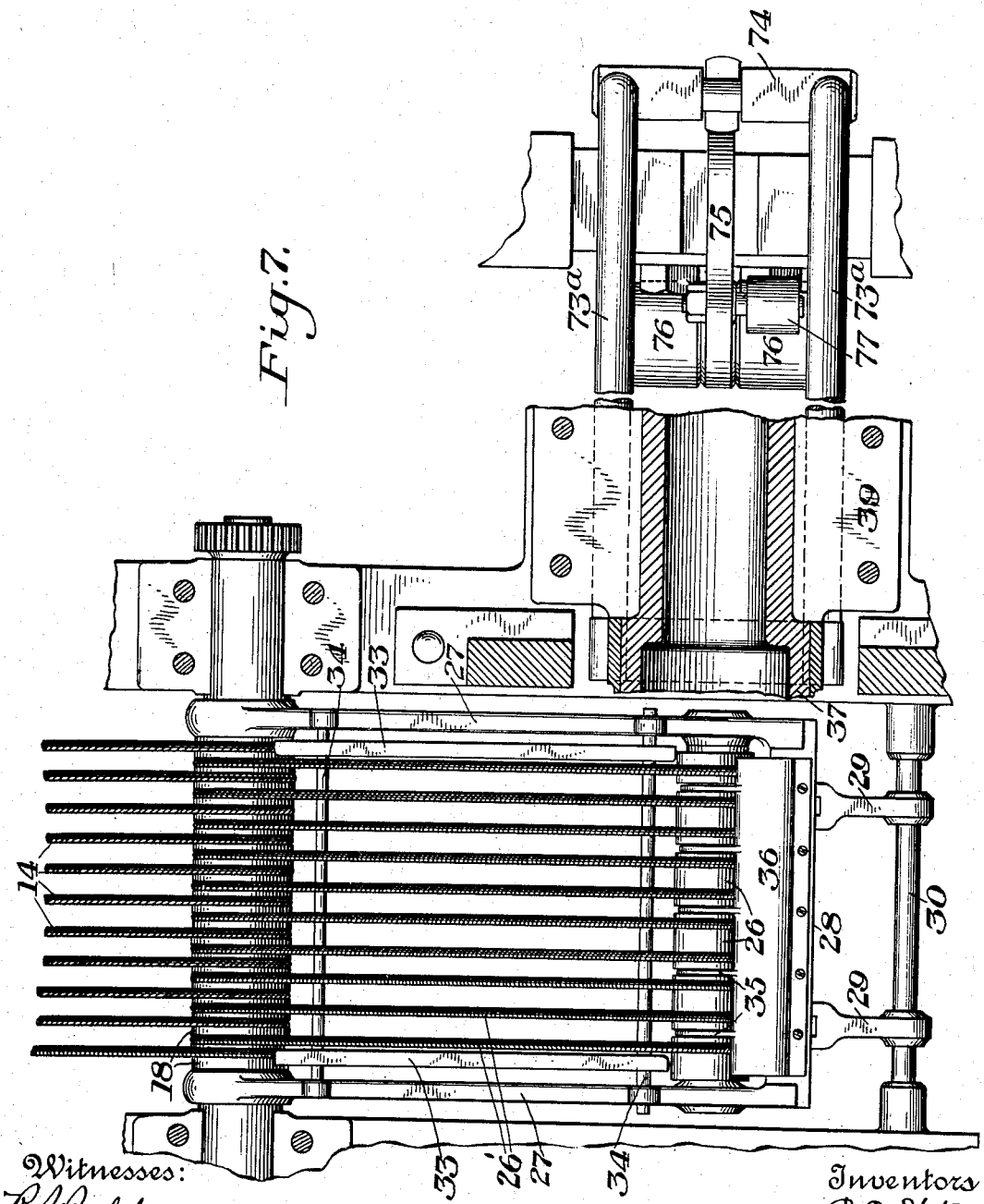

UNITED STATES PATENT OFFICE.

CHARLES C. STUTZ, OF NORWOOD, OHIO, AND ROBERT F. ARNOTT, OF UPPER MONTCLAIR, NEW JERSEY, ASSIGNORS TO ISADORE L. MYERS, OF PLAINFIELD, NEW JERSEY.

APPARATUS FOR THE MANUFACTURE OF PAPER CARTONS.

1,202,121.      Specification of Letters Patent.      Patented Oct. 24, 1916.

Application filed February 16, 1912. Serial No. 678,100.

*To all whom it may concern:*

Be it known that we, CHARLES C. STUTZ, a citizen of the United States of America, residing at Norwood, in the county of Hamilton and State of Ohio, and ROBERT F. ARNOTT, a subject of the King of Great Britain, residing at Upper Montclair, in the county of Essex and State of New Jersey, have invented a new and useful Improvement in Apparatus for the Manufacture of Paper Cartons, of which the following is a full, clear, and exact description, reference being had to the accompanying drawings, forming part of this specification, in which—

Figure 1:
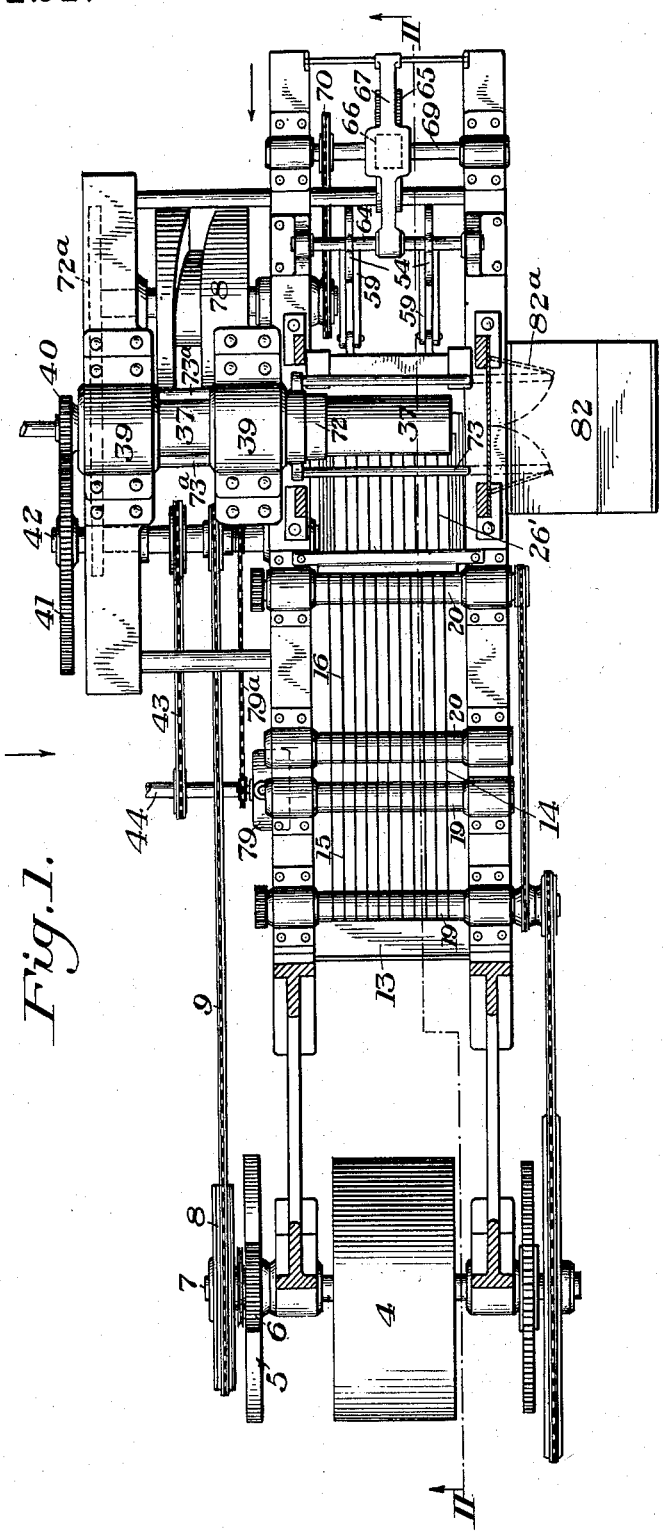
Figure 2:
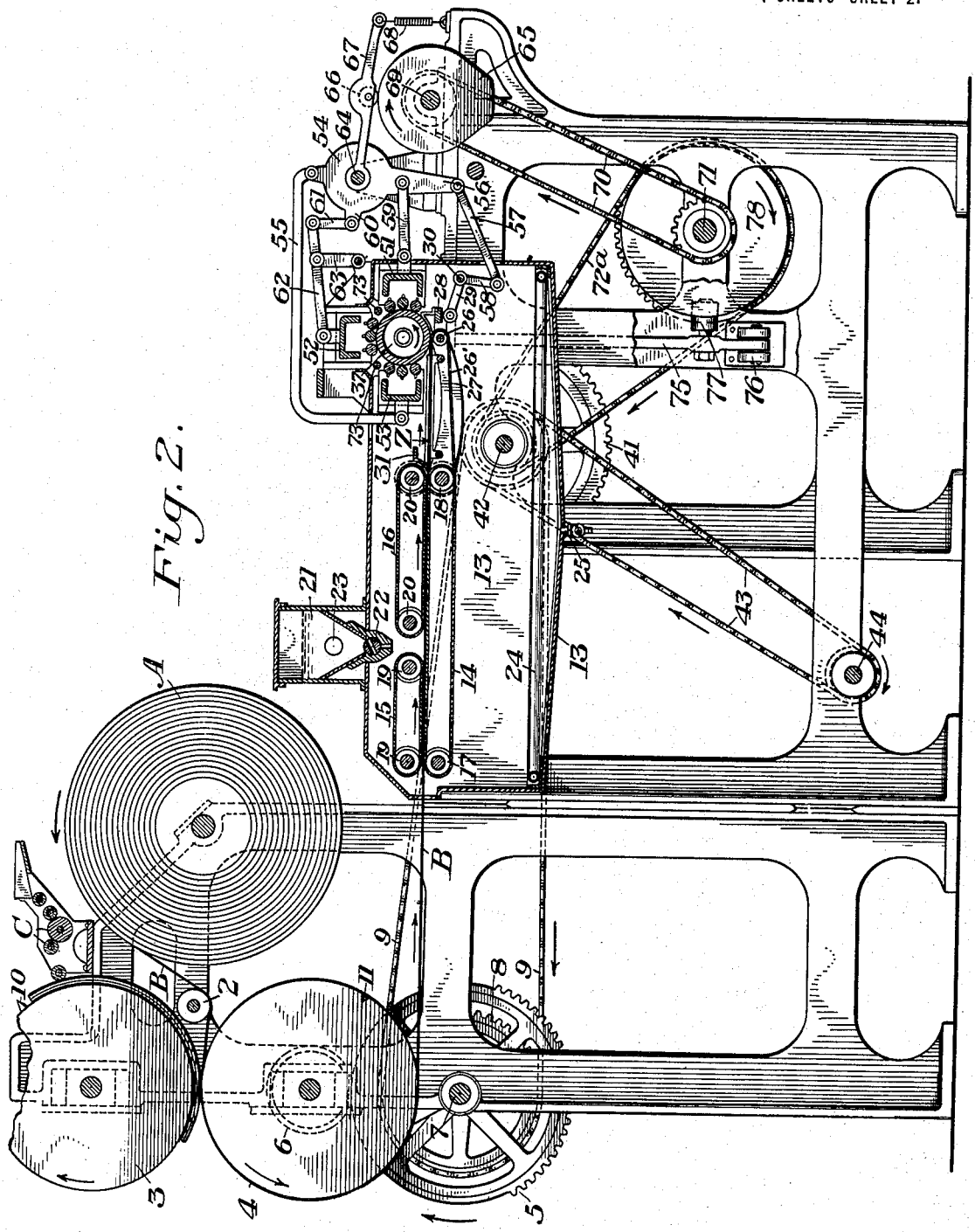
Figure 3:
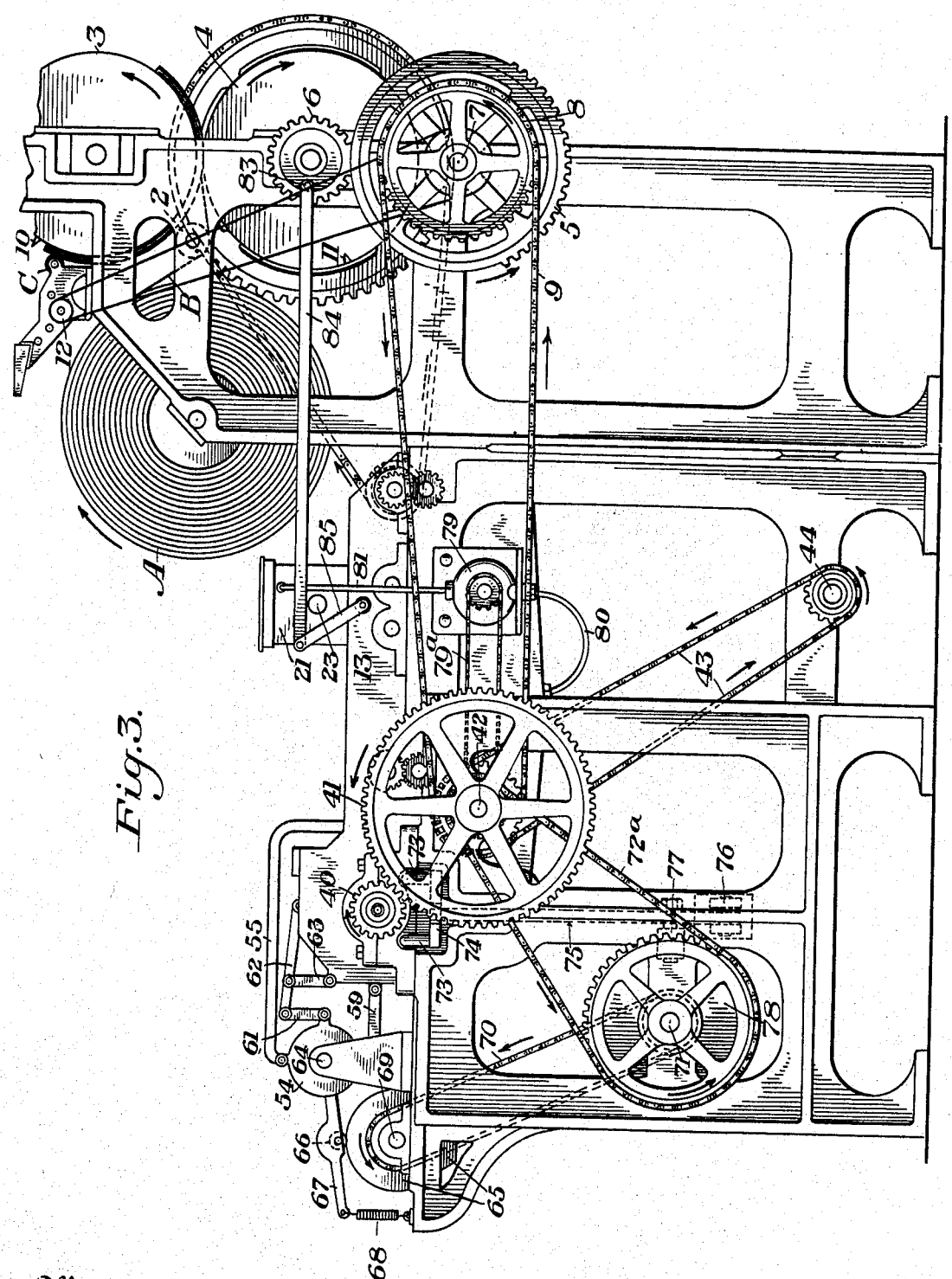

Figure 1 is a top plan view showing one form of apparatus constructed in accordance with our invention, with the top of the chamber removed to show the working parts. Fig. 2 is a longitudinal vertical section on the irregular line II—II of Fig. 1, looking in the direction of the arrow, and showing the parts in the position when the paper is being wound upon the mandrel. Fig. 3 is a side elevation at the side of the arrow in Fig. 1. Fig. 4 is an end elevation showing the right-hand end of the machine as in Fig. 1. Fig. 5 is an enlarged partial longitudinal section on the irregular line II—II of Fig. 1. Fig. 6 is an enlarged partial section on the line VI—VI of Fig. 5 looking in the direction of the arrow. Fig. 7 is an enlarged sectional plan view of the conveyer belts. Fig. 8 is a detail of a pressure device hereinafter referred to. Figs. 9, 10 and 11 are enlarged detail views of the guide frame for the sliding carriage and of the sliding carriage itself, and of the spring pressed roller bearings.

Our invention relates to an apparatus for forming paper cylinders or cartons by winding paper on a mandrel and cementing it in the wound form, thus making the body of a package whose ends may be closed in any suitable manner, as by paper caps. In such cases the paper is paraffined to make the package air and water-tight, and the ends or caps are also preferably paraffined and applied to the body in any desirable manner.

In carrying out our invention, we prefer to use a multiple band of paper, or similar material of two or more plies or layers, instead of a single band or strip of one ply as heretofore employed. The apparatus may, however, be used with a single layer of one ply of paper; and by the words "band" or "strip" in our broader claims we intend to cover either the single or multiple form of paper strip.

A continuous roll of paper, preferably of the multiple strip form, is fed through printing rolls, to print any desirable matter thereon, and is then perforated transversely in lengths desirable for making the cylinders, and is then passed into a heated chamber. Within the heated chamber it is soaked in hot liquid paraffin, preferably by dropping the same thereon in a sheet extending across the width of the paper, and is then fed to a rotating mandrel having the diameter of the cylinder desired. The paper is directed upon this mandrel, and wound thereon during a certain number of turns, is then parted or pulled apart at the perforations, and the layers are kneaded and pressed together while hot by groups of external rollers around the mandrel. The shell thus formed is removed or stripped endwise from the mandrel, and may drop upon a conveyer to be taken to the capping machine.

The severing of the paper at the line of perforations is preferably accomplished by automatically stopping the feed rollers when the last turn on the mandrel is nearly wound up. The mandrel which runs continuously will thereupon pull on the paper and break it at the perforation and complete the winding up of the free end. The cylinder is then given several more turns and well kneaded together by the external rollers, which are withdrawn automatically before the cylinder is stripped off from the mandrel. When the stripper has returned to its normal position, the external kneading rollers are moved inwardly, the feed rollers automatically start up again, and the next length of paper is fed forward to the mandrel, and the operation is repeated.

In the drawings, A represents the roll of paper supply, and B the paper band or strip drawn therefrom. As the paper is unwound from the roll, it passes under an idler roll 2, and thence between the printing rollers 3 and 4.

5 is an intermittent or mutilated gear wheel intermeshing with intermittent pinion 6 on the shaft of the printing roll 4, the shaft 7 for the mutilated gear having a sprocket wheel 8 engaged by driving sprocket chain 9. The inking rollers are indicated at C in Fig. 2, in which 10 indicates the perforators on the upper printing roll 3, which act to transversely perforate the paper at the desired lengths. These perforators coact with corresponding indents 11 in the lower roller 4. The inking rollers may be driven by pulley 12 belted as shown in Fig. 3.

The above mechanism is mounted on the general frame of the apparatus, and after the paper has reached the lower side of the lower printing roller, it passes forwardly in a horizontal direction, as shown by the arrow in Fig. 2, through a slot in the end of a heated chamber 13. Within this box it passes between the lower spring wire conveyer belt 14 and upper spring wire guard belts 15 and 16. The conveyer belt 14 passes over the feed roller 17 at one end and the roller 18 at the other end, while the spring wire guard belts 15 and 16 pass over rollers 19, 19 and 20, 20. The driving connections for these rollers are illustrated in Fig. 1 and need not be further described. The two sets of guard belts are separated to admit the cross sheet of dropping hot molten paraffin from the paraffin tank 21, having a longitudinal nozzle extending across within the chamber and provided with control valve 22.

23 indicates a part of a steam heating coil for keeping the paraffin in molten condition. The chamber 13 may be heated by steam coil shown at 24, 25 being a drain for the chamber. Engaging grooves in the lower feed roller 18, and in pressure roller 26 is another set of spring wire conveyer belts 26′. The roller 26 is mounted on rock levers 27, pivoted on an axis which is the center of the roller 18, and having a crossbar 28 engaged by rollers on rock arms 29 secured to rock shaft 30. Beyond the rear roller 20 we provide a guard plate 31 having guard fingers 32 to hold down the paper strip; and for the same purpose we provide guard angles 33 at each side of the belts 26′. These angles are connected to brackets secured to tie rods 34 for the rock levers 27. The pressure roller 26 is provided with supplemental grooves, as is also the roller 20; and in these grooves in roller 26 project the guard fingers 35 of the guard pad 36, and in the grooves in roller 20 project the guard fingers 32 of the guard pad.

From the guard pad 36 the strip of paper passes upwardly around a mandrel 37, which is mounted in suitable bearings 39 at one end thereof. The mandrel is continuously rotated by toothed pinion 40 engaging toothed wheel 41 on shaft 42. Shaft 42 is driven by sprocket chain connection 43 from the main driving shaft 44. The mandrel 37 is hollow, closed at both ends, and provided with concentric inlet and outlet pipes 45 and 46 for circulating a fluid such as steam through the mandrel. The mandrel may be either heated or cooled by the circulating fluid, the pipe system being designed to keep it at the desired temperature.

To hold the paper firmly upon the mandrel as it is wound thereon, and to thoroughly knead the layers, we preferably provide three nests of spring-pressed rollers, which are marked respectively 47, 48 and 49. The shafts of all these rollers are carried in bearings mounted on spring-pressed stems 50, the limit of their inner movement being fixed by nuts 50ª, see Fig. 11. Each nest of rollers is carried in a hollow yoke or frame designated respectively 51, 52 and 53. These yokes or frames are mounted in suitable guideways in the frame of the machine, and are simultaneously moved toward and from the mandrel 37 by suitable connections. In the form shown, this movement is accomplished by disks 54, having pivoted thereto curved links 55, the other legs of which are pivoted to projections on the reciprocating frame 53. These disks also have downwardly projecting arms 56, to which are pivoted links 57 having spring-pressed plungers 57ª, arranged to actuate lever arms 58 and thereby raise and lower the pressure roller 26 and the guide pad. The springs engaging the plungers 57ª are adjusted so as to apply a predetermined pressure to the strip as it passes between the roller 26 and the mandrel 37. The arms 56 are also provided with pivotal links 59, the other ends of which are pivoted to projections on the hollow frame 51. To a third arm 60 of the rock disks are connected links 61, pivoted to floating levers 62, which are pivotally mounted on link 63 pivoted to the frame of the machine. The other ends of the levers 62 are pivoted to projections on the reciprocating frame 52.

The rock disks 54 are keyed to a rock shaft 64, which is rocked by cam 65 acting on roller 66 on lever 67, which is keyed to the shaft 64. The lever 67 is normally held downwardly so that the roller 66 is pressed against the cam by a spring 68. The cam 65 is mounted on shaft 69 driven by sprocket chain 70 extending down around a sprocket wheel on the shaft 71, which is in turn driven from the shaft 42 by means of a sprocket chain 72ª.

The stripper consists of a sleeve 72, surrounding the inner end of the mandrel, and having projections to which are secured rods 73 and 73ª. The rods 73ª extend laterally and are secured to yoke 74, the central part of which is cylindrical, and is engaged by the forked end of an arm 75. This arm 75 is pivoted at 76 to a lug extending from the frame of the machine, and has a roller 77 seated in a groove of a stripper cam 78, which is secured to the shaft 71.

79 is a paraffin circulating pump, having suction and delivery pipes 80 and 81, which is driven by means of a sprocket chain 79ª, on a sprocket wheel connected to the shaft 42.

In the operation of the machine, the paper is drawn from the supply roll A and taken around the idler 2 to the printing rollers 3 and 4, the name, etc., being printed on the outer surface of the band or strip B by the type or plate on the upper roller, which is inked by rollers C. The strip then passes around the lower roller 4, the printing being in full view of the operator and open to inspection; and in passing between the rollers the band is perforated transversely by the perforators on the upper roller coöperating with the indents in the lower roller. The band then enters the hot box or closed heated chamber 13, where it is engaged by the feed rollers 17 and 19, and fed forward on the spring wire conveyer belts passing underneath the paraffin tank, where it is soaked by the hot paraffin dropping from the transverse valve-controlled orifice. During this time the band is held down by the spring wire guard belts; and then passes on through the feed rollers 18 and 20 and is carried by the spring wire conveyer belts 26′ to the mandrel. The now somewhat sticky paper band is prevented from hugging the upper feed roller 20 by means of the guard fingers 32, and is further guarded by the plate 31 carrying such fingers. The guard angles 33 engage the edges of the paper and hold it down on the conveyer belts 26′, and on reaching the mandrel, the paper band or strip is pressed against it by the pressure roller 26, being prevented from hugging this roller by the guard fingers 35. The guide pad 36 guides the paper up around the mandrel until it almost reaches the lower spring-pressed roller of the group 47; and the strip then passes on around the mandrel until it has made about three and a quarter turns. At this time the perforation in the band will have reached the position marked Z on Fig. 2, and the intermittent gear 5 is so timed that the blank portion of the intermittent pinion 6 engages the blank portion of gear 5, as shown in Fig. 2, thus stopping further rotation of the printing and feed rollers and interrupting the movement of the paper band from the roll A. As the mandrel continues to rotate, it immediately pulls on the paper and breaks it at the perforations and then winds up the remaining end. The mandrel then makes about four more revolutions, during which time the cylinder is well kneaded by the nest of spring pressed rollers, which are in their inward position, as shown in Fig. 2. On completing the fourth revolution, the cam 65 acts to raise the lever 67, thus rocking disks 54 and moving the reciprocating carriages 51, 52 and 53 outwardly from the mandrel and at the same time allowing the pressure roller 26 and its attached parts to drop away from the mandrel, as shown in Fig. 5. While these parts are thus held away from the mandrel, the high point on the stripper cam 78 engages the roller 77 and moves the stripper sleeve 72 axially on the mandrel to the position shown by dotted lines in Fig. 6, thus pushing the completed cylinder off from its overhung end into a suitable receptacle, such as shown at 82 in Fig. 1. At the beginning of the forward movement of the stripper the rods 73 engage and open spring-pressed doors 82ª in the side of the chamber 13 and above the receptacle 82. The stripper immediately returns to its normal position by the further rotation of its cam, and permits the doors 82ª to close and prevent the escape of heat from the chamber 13. The cam 65 now allows the lever 67 to descend under the pull of the spring 68, thus bringing the spring pressed rollers back into operative position as well as the pressure roller and pad 36. At this time, the intermittent gear 5 has again come into mesh with the intermittent pinion 6, thus again starting the printing and feed rollers so that the paper band is again fed forwardly and the cycle of operations above described is repeated. When the rotation of the feed rollers is stopped through the intermittent gear, the valve 22 of the paraffin tank is closed by crank pin 83 acting through link 84 and lever 85. Instead of opening and closing the paraffin valve, it may be allowed to run continuously and flow to a lower receptacle, from which it is pumped back to the tank by the pump 79. Each turn of the paper band on the mandrel will slightly increase the effective diameter of the mandrel, thus increasing the speed of winding and drawing the band tighter, thus winding the layers well together. This may also cause the band to part at the perforations, such band being paraffin-soaked.

The advantages of our invention will be obvious to those skilled in the art, since a comparatively simple, effective apparatus is provided for forming the paraffin-soaked and cemented cylinders or cartons. One of the important advantages arises from the thorough and uniform impregnation and soaking of the paper with the paraffin. In prior systems it has been found that the paraffin was in blotches and spots and was not uniformly distributed. This gave weakness in parts of the cylinder, and was objectionable. The apparatus will give a large output of cylinders, and is automatic in its action. By using a multiple layer or strip, a thinner paper can be used which will stick together better at the ends after winding, and gives a more thoroughly soaked and uniformly cemented cylinder.

Many changes may be made in the form and construction of the parts without departing from our invention.

We claim:—

1. In an apparatus for forming hollow paper cartons or packages, the combination of a heated chamber having a mandrel arranged to rotate therein, a paper conveying means extending within said chamber for delivering the paper to the mandrel, and a plurality of kneading devices arranged adjacent to the mandrel, together with means for applying an adhesive to the paper within said chamber, substantially as described.

2. In an apparatus for forming hollow paper cartons or packages, a heated chamber having a mandrel arranged to rotate therein, a conveyer within said chamber for conveying a paper strip to the mandrel, means for applying an adhesive material to the paper within the chamber, and a plurality of kneading devices arranged adjacent to the mandrel and arranged to act upon the paper thereon at a plurality of points extending around at least one-half the diameter of the circumference of the mandrel, substantially as described.

3. Apparatus for forming hollow paper cartons or packages, comprising a heated chamber having a mandrel arranged to rotate therein, a lower conveyer within the chamber and arranged to convey a paper strip to the mandrel to be wound thereon, separated upper conveyers, and means for applying a coating material to the paper strip between the separated upper conveyers, substantially as described.

4. In apparatus for forming hollow paper cartons or packages, a mandrel, connections for continuously rotating the same, a traveling belt within said chamber arranged to feed the paper to the mandrel, means for moving said belt, and means for raising and lowering the belt into and out of engagement with the mandrel; substantially as described.

5. In apparatus for forming hollow paper cartons or packages, a mandrel, connections for continuously rotating the mandrel, a continuously moving belt, means for moving said belt, means for intermittently moving the belt into engagement with the mandrel, external kneading rollers, and mechanism for moving said kneading rollers into and out of engagement with the mandrel; substantially as described.

6. In apparatus for forming hollow paper cartons or packages, an inclosed heated chamber, a mandrel within said chamber, means for feeding a strip of paper to said mandrel, means for rotating the mandrel, external rollers arranged to knead the paper on the mandrel, within the heated chamber, mechanism for moving the rollers toward and from the mandrel, and stripping mechanism in timed relation with the roller mechanism arranged to strip the tube from the mandrel when the rollers have been moved away from the mandrel; substantially as described.

7. In apparatus for forming hollow paper cartons or packages, a mandrel, a movable feed roller for feeding a strip of paper thereto, mechanism for moving the feed roller toward and from the mandrel, groups of kneading rollers, and connections from a moving part of the apparatus for moving the kneading rollers toward and from the mandrel; substantially as described.

8. In apparatus for forming hollow paper cartons or packages, a continuously rotating mandrel, paper feed mechanism movable toward and from the mandrel, mechanism for rotating and moving said feed mechanism, means for perforating the paper as it is fed to the mandrel, and mechanism for intermittently stopping the paper feed mechanism whereby the mandrel pulls the paper apart at the perforations; substantially as described.

9. In apparatus for forming hollow paper cartons or packages, a mandrel, mechanism for continuously rotating said mandrel, a rotatable feeding roller movable toward and from the mandrel, mechanism for rotating said roller, mechanism for moving said roller toward and from the mandrel, a perforating device, a paper feeding device for feeding the paper to the feed roller, and mechanism for automatically stopping and starting the last mentioned feed mechanism, whereby the rotation of the mandrel will pull the paper apart at the perforations; substantially as described.

10. In apparatus for forming hollow paper cartons or packages, a mandrel, connections for continuously rotating the mandrel, means for feeding the paper to the mandrel, external kneading rollers for kneading the coated paper while it is being wound on the mandrel, lever mechanism for moving the rollers to and from the mandrel, a lever for moving the feeding mechanism toward and from the mandrel, a rock shaft, connections between the lever-actuating mechanism for the rollers and the feeding mechanism and the rock shaft, and means for rocking the shaft; substantially as described.

11. In apparatus for forming hollow paper cartons or packages, a mandrel, connections for continuously rotating the mandrel, endless carriers for feeding coated paper to the mandrel, means for moving one of said carriers toward and from the mandrel and guards for preventing the coated paper from sticking to the carriers; substantially as described.

12. In an apparatus for forming hollow paper cartons or packages, a heated chamber containing a mandrel arranged to rotate therein, a conveyer working longitudinally within the chamber to convey a paper strip to the mandrel to be wound thereon, means for applying an adhesive material to the paper within the chamber, a plurality of kneading devices movable toward and away from the mandrel at different sides thereof, and a stripping device arranged to coöperate with the mandrel, substantially as described.

13. Apparatus for forming hollow paper cartons or packages, comprising a rotatable mandrel, a conveyer for feeding a paper strip to be wound upon said mandrel, said conveyer having its delivery end portion movable toward and away from the mandrel, a plurality of kneading devices, and actuating connections between the movable element of the conveyer and the kneading devices whereby said element and the said devices may be simultaneously moved toward and away from the mandrel, substantially as described.

In testimony whereof, we have hereunto set our hands.

CHARLES C. STUTZ.
ROBERT F. ARNOTT.

Witnesses as to Charles C. Stutz:
JOHN E. MOLONEY,
JAMES KENNEDY.

Witnesses as to Robert F. Arnott:
ROBT. R. CARNEY,
HERMAN E. LUPHAN.